United States Patent [19]

Hipp

[11] 4,264,259

[45] Apr. 28, 1981

[54] RELEASABLE LOCKING DEVICE

[75] Inventor: Steven J. Hipp, Milwaukee, Wis.

[73] Assignee: Rite-Hite Corporation, Milwaukee, Wis.

[21] Appl. No.: 72,830

[22] Filed: Sep. 6, 1979

[51] Int. Cl.³ .................................................. B65G 69/00
[52] U.S. Cl. ..................................................... 414/401
[58] Field of Search ............... 414/401, 585, 584, 396, 414/402; 292/201, 96, 110; 410/92, 77

[56] References Cited

U.S. PATENT DOCUMENTS

| | | | |
|---|---|---|---|
| 1,418,966 | 6/1922 | Perin ................................ | 414/401 X |
| 2,693,284 | 11/1954 | Gerhardt ........................... | 414/584 X |
| 3,250,408 | 5/1966 | Daniluk et al. ................... | 414/401 X |
| 4,208,161 | 6/1980 | Hipp et al. ........................ | 414/401 |

Primary Examiner—Stephen G. Kunin
Assistant Examiner—L. E. Williams
Attorney, Agent, or Firm—Neuman, Williams, Anderson & Olson

[57] ABSTRACT

A releasable locking device is provided which is particularly suitable for retaining a parked vehicle against a loading dock or the like during loading or unloading thereof. The device includes a pivotally mounted hook-like member movable between operative and inoperative modes. The member is secured to the front side of the loading dock by a carriage having a first section on which the hook-like member is mounted, and a second section affixed to the dock front side. The first section is adjustable relative to the second section in a substantially vertical plane. The first section is biased to normally assume a predetermined rest position which is at a maximum elevation with respect to the roadway supporting the vehicle. A reversible electric motor is mounted on the carriage first section and actuates the hook-like member between the operative and inoperative modes. When in an operative mode, the hook-like member interlockingly engages the parked vehicle. When in an inoperative mode, the hook-like member assumes a vehicle-release position. Manual controls are provided for regulating the operation of the motor. The carriage first section includes an outwardly projecting cam segment which is engaged by the vehicle when being maneuvered into a parked position and will cause the first section to move vertically downwardly thereby enabling the member to interlockingly engage the vehicle in response to the manual controls.

9 Claims, 5 Drawing Figures

RELEASABLE LOCKING DEVICE

BACKGROUND OF THE INVENTION

It is imperative from a safety standpoint before loading or unloading a vehicle (e.g., truck or trailer) parked at a loading dock that the vehicle be effectively restrained from moving away from the dock. Various devices have heretofore been proposed to accomplish the desired result; however, such devices are beset with one or more of the following shortcomings: (a) the operation of the device is adversely affected by weather conditions; (b) the device is susceptible to being damaged by the vehicle when being maneuvered into a parked position; (c) the device incorporates numerous components requiring an inordinate amount of servicing and maintenance; (d) the device is difficult to install and oftentimes requires substantial structural modifications to be made to the existing loading dock; (e) the device requires the party manipulating same to be located on the roadway adjacent the dock while the vehicle is being maneuvered into the parked position and, thus, care must be exercised by such party to avoid being struck by the vehicle; (f) the device is incapable of accommodating vehicles, the physical dimensions of which vary over a wide range; (g) manipulation of the device requires the expenditure of a substantial amount of manual effort; and (h) the device cannot effectively compensate for height variations of the vehicle load-bearing bed during the loading or unloading operations.

SUMMARY OF THE INVENTION

Thus, it is an object of the invention to provide a releasable locking device of the type described which avoids all of the aforenoted shortcomings.

It is a further object of the invention to provide a releasable locking device which is of simple, compact, yet sturdy construction and may be readily compatible with other equipment (e.g., dock levelers) incorporated in the loading dock.

It is a still further object of the invention to provide a releasable locking device, the operating controls of which may be remotely located and effectively secured against unauthorized use.

Further and additional objects will appear from the description, accompanying drawings and appended claims.

In accordance with one embodiment of the invention, a device is provided for releasably locking a parked vehicle against a loading dock or the like while the vehicle is being loaded or unloaded. The device includes a pivotally mounted member which is movable between operative and inoperative modes. When in an operative mode, the member has a distal portion thereof in interlocking engagement with the parked vehicle and substantially restrains movement of the vehicle away from the loading dock. When in an inoperative mode, the distal portion of the member is disposed in a vehicle-release position. A power means is provided for actuating the pivotally mounted member between the operative and inoperative modes. A manual control is operatively connected to the power means for regulating the actuation thereof and the direction of movement of the pivotally mounted member. A carriage is provided having a vertically adjustable first section on which the pivotally mounted member is disposed, and a second section fixedly mounted on the front wall of the loading dock. The carriage first section is biased to normally assume a rest position of maximum elevation relative to the roadway on which the vehicle is parked.

DESCRIPTION

For a more complete understanding of the invention, reference should be made to the drawings wherein FIG. 1 is a fragmentary perspective view of one form of the improved locking device shown attached to the front wall of a loading dock.

Figure 1:
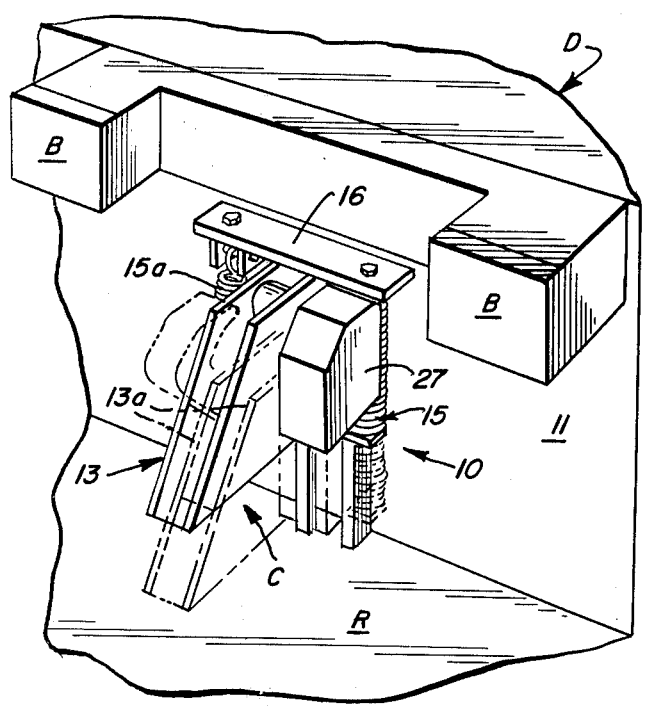

Referring now to the drawings and more particularly to FIG. 1, one form of the improved locking device 10 is shown mounted on the vertical front wall 11 of a conventional loading dock D. The load-supporting surface of the dock is normally horizontal and is elevated a predetermined distance above the roadway or ramp R on which a vehicle, not shown, is parked during the loading or unloading operation.

The locking device 10 serves to retain the vehicle against conventional bumper pads B, or the like, projecting outwardly from the front wall 11. The pads prevent damage to the dock and the rear end of the vehicle while the latter is being maneuvered into a parked position adjacent the dock front wall.

Device 10 includes a pivotally mounted hook-like member 12 which is supported by a section 13 of a carriage C. Section 13 includes a pair of outwardly projecting vertically disposed substantially parallel plate-like members 13a. The hook-like member 12 is positioned between the members 13a. Section 13 is vertically adjustable relative to a second section 14 which is affixed to the front wall 11 of the dock D. Vertical adjustment of section 13 compensates for height variations of the vehicle load-supporting bed as the vehicle is being loaded or unloaded without causing damage to the device or vehicle, or accidental disengagement of the hook-like member 12 from the vehicle.

Carriage section 13 is biased by a pair of coil springs 15 to normally assume a predetermined rest position, see FIG. 1, with respect to section 14 wherein section 13 is at its maximum elevated position with respect to roadway R. The springs 15 are disposed on opposite sides of section 13 and have the upper ends 15a thereof connected to a horizontally disposed cross-arm 16 secured to stationary section 14. The lower ends 15b of the springs are connected to laterally extending lugs 17 mounted on carriage section 13.

Figure 5:
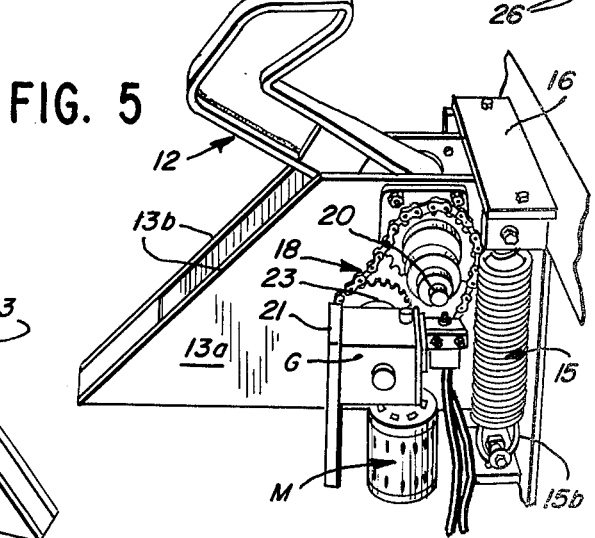
FIG. 5 is similar to FIG. 4 but showing the hook-like member in an operative mode.

When section 13 is at its rest position, the upper edges 13b of the plate-like members 13a are slidably engaged by a depending I.C. section or safety bar which is required to be carried at the rear end of the vehicle. Surfaces 13b are upwardly inclined and serve as cams, thereby causing the carriage section 13 to move downwardly as the vehicle is being backed into its parked position so that the hook-like member 12 can be pivoted to an operative mode, see FIG. 5, whereby the distal end 12a of the member will engage behind the I.C.

section or bar and hold the vehicle in place against the bumper pads B.

Figure 2:
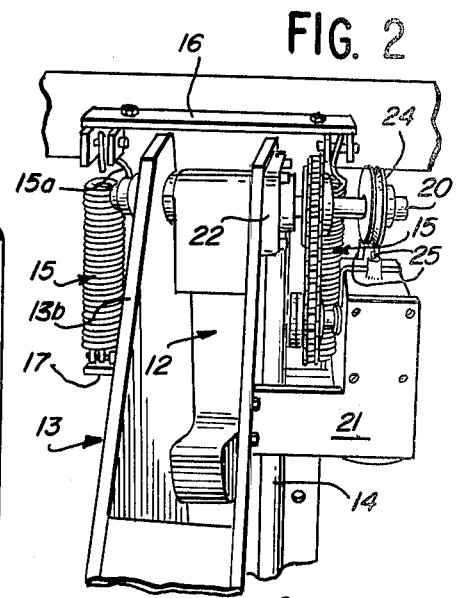
FIG. 2 is an enlarged fragmentary, perspective front view of the device of FIG. 1 with the protective shield therefor removed and the hook-like member shown in an inoperative mode.
Figure 4:
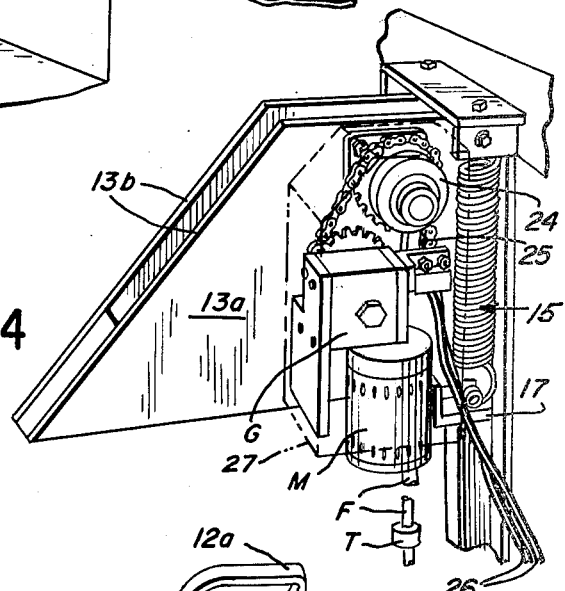
FIG. 4 is similar to FIG. 3 but of the right side of the device of FIG. 2 and showing the protective shield in phantom lines.
Figure 3:
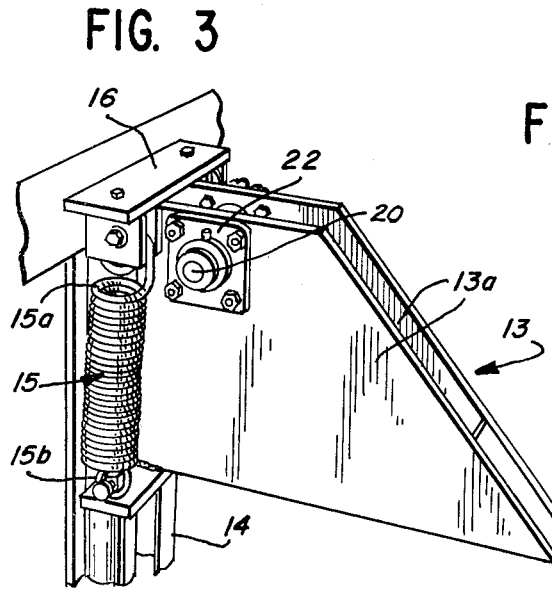
FIG. 3 is an enlarged fragmentary perspective left side view of the device shown in FIG. 2.

The member 12 is actuated between operative and inoperative modes by a reversible electric motor M, or the like, having the drive shaft thereof connected to a gear box G which in turn is connected by a sprocket and chain assembly 18 to a shaft 20 mounted for rotation about its longitudinal axis. The motor and gear box are attached to a bracket 21 which extends laterally from one of the plate-like members 13a. The shaft 20 extends transversely through the upper portions of the plate-like members 13a and is supported by suitable horizontally aligned bearings 22 mounted on the members 13a, see FIGS. 2, 3.

The hook-like member 12 is keyed to shaft 20 and rotates therewith. To prevent over-pivoting of member 12 in either direction, a conventional friction clutch 23 may be provided which is located between the output side of the gear box G and one of the sprockets of assembly 18 which is disposed adjacent the gear box. Electric power for the motor M is provided through a conventional flexible cable F extending from a source located on or adjacent to the dock D. Keyed to one end of shaft 20 may be a cam disc 24 which actuates or de-actuates a pair of switches 25 fixedly mounted on the exterior of gear box G. The switches 25 are connected by suitable wiring 26 to audio and units, not shown. The units alert persons in the vicinity of the loading dock that the hook-like member 12 is in either its operative or inoperative mode. Switches 25 and the units are optional accessories.

The cable F attached to and extending from motor M terminates at manual push button controls, not shown, which are preferably located remotely from the member 12 so that, when the dock is not being used, the push buttons can be secured by a door or the like against manipulation by unauthorized personnel. Furthermore, by having the controls remotely disposed, the hazard of operating personnel being injured by a vehicle while being maneuvered towards or away from the dock D is significantly reduced.

To protect and conceal motor M, gear box G, sprocket and chain assembly 18, the protruding end of shaft 20, and cam disc 24 from weather and vandalism, and for safety reasons as well, a shield 27 is provided which is secured to bracket 21, the latter extending from one of the carriage plate-like members 13a. Thus, all of the aforementioned components move as a unit with carriage section 13 and are not susceptible to damage by the maneuvering vehicle.

The carriage section 14 which is affixed to the dock front wall 11 may be provided with suitable guides which are engaged by rollers or the like, attached to carriage section 13. The vertical adjustment of carriage section 13 and the controlled manipulation of the hook-like member 12 enable the device 10 to accommodate vehicles which vary in size and shape over a wide range.

If desired, conventional timers T may be interposed the motor M and the push button controls which would activate the motor for only a short duration (e.g. 1 second) which is sufficient to move the member 12 from an inoperative mode to an operative mode, or visa versa. Thus, if the controls are pushed by the operator for a greater period of time or become struck in a depressed state, the timers would prevent the motor from over-actuating the hook-like member 12 in either direction.

The size and configuration of the various components comprising the device may be varied from that shown without departing from the scope of the invention. The improved device is of compact, sturdy construction, reliable in operation and embodies numerous safety features which protect both the operating personnel as well as the device itself.

I claim:

1. A releasable locking device for securing a parked vehicle to an adjacent structure, said device comprising a first means mounted for pivotal movement between an operative mode and an inoperative mode, when in an operative mode, said first means having a distal portion thereof adapted to interlockingly engage a portion of the parked vehicle and substantially restrain movement thereof away from the adjacent structure and, when in an inoperative mode, having said distal portion assume a vehicle-release position; second means for power actuating said first means between said modes; third means operatively connected to said second means for controlling operation of said second means; and a carriage having a first section on which said first and second means are mounted, said first section being movable relative to a second section upon an external force of predetermined magnitude being exerted on said first section, said second section being fixedly mountable on the adjacent structure, said first section being biased to normally assume a predetermined rest position relative to said second section.

2. The locking device of claim 1 wherein the relative movement of said carriage first section with respect to said carriage second section is in a substantially vertical plane and the predetermined rest position to which said carriage first section is biased being adapted to be at the maximum elevation with respect to the surface supporting the parked vehicle.

3. The locking device of claim 2 wherein said carriage first section includes an outwardly projecting cam segment for being slidably engageable with the vehicle and effecting downward relative movement of said carriage first section from said predetermined rest position upon the vehicle being maneuvered into the parked position.

4. The locking device of claim 3 wherein said first means is recessed from the surface of sliding engagement between the cam segment and the vehicle when said first means is in an inoperative mode.

5. The locking device of claim 1 wherein said carriage first section includes at least one switch, the adjustment of which being effected by an element movable as a unit with said first means and independently of said switch.

6. The locking device of claim 1 wherein said second means is provided with a protective shield affixed to and movable with said carriage first section.

7. The locking device of claim 1 wherein the second means includes a reversible drive motor and power transmitting means interconnecting said drive motor and said first means, said drive motor and power transmitting means being mounted on and movable as a unit with said carriage first section.

8. The locking device of claim 7 wherein said power transmitting means includes a friction clutch unit.

9. The locking device of claim 1 wherein said third means includes a manually actuaged switch and a timer interposed said switch and said second means, said timer effecting automatic de-activating of said first means after a predetermined time lapse following manual actuating of said switch.

* * * * *